Patented Aug. 15, 1950

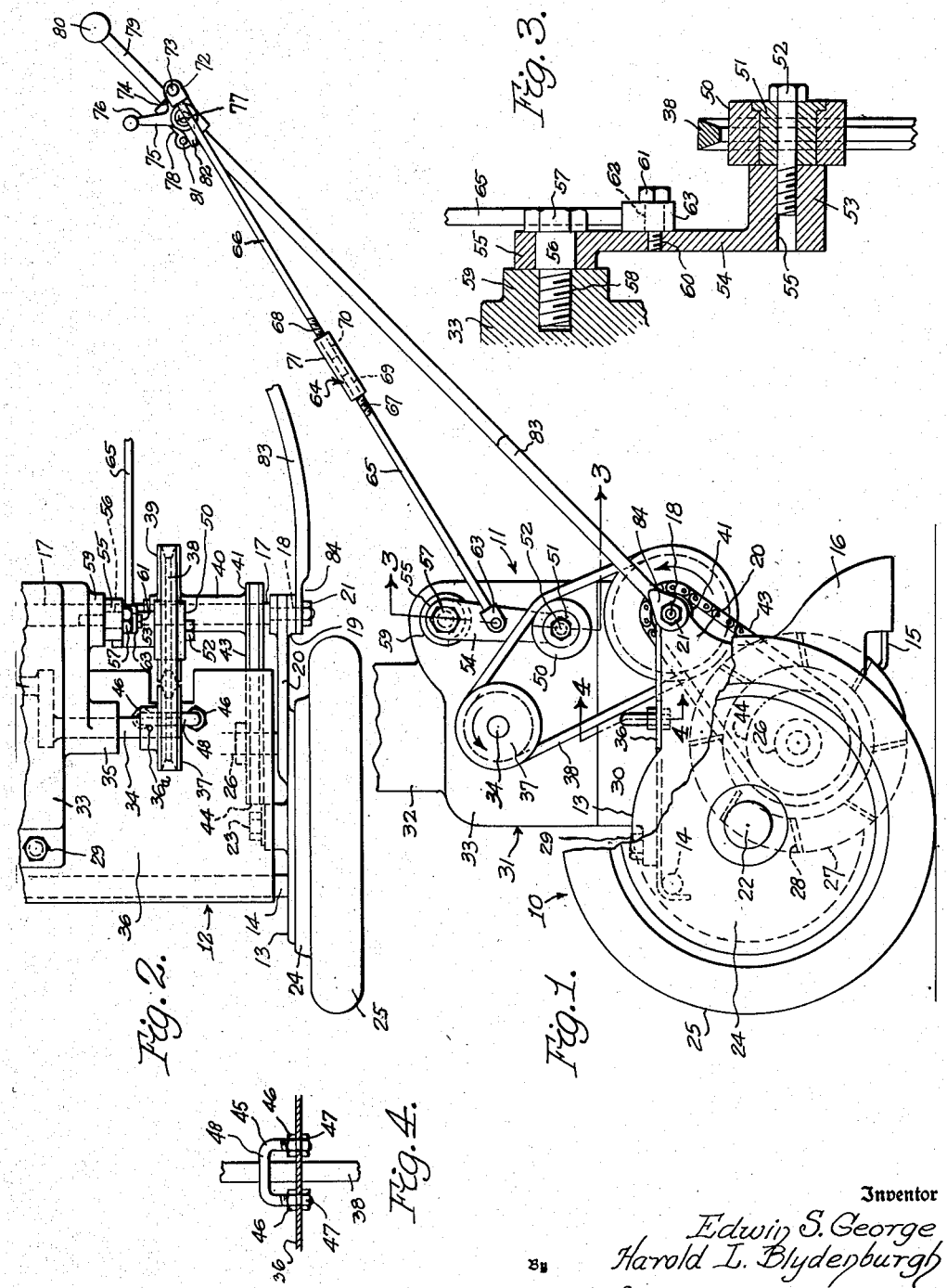

2,519,039

UNITED STATES PATENT OFFICE 2,519,039

DRIVING MECHANISM FOR POWER LAWN MOWERS

Edwin S. George, Bloomfield Hills, and Harold L. Blydenburgh, Highland Park, Mich., assignors to The Moto-Mower Company, Detroit, Mich., a corporation of Michigan Application October 25, 1947, Serial No. 782,158

1 Claim. (Cl. 56—26)

This invention relates to power lawnmowers and in particular to driving mechanisms for such lawnmowers.

One object of this invention is to provide a power lawnmower driving mechanism wherein the driving connection between the engine drive shaft or other power output shaft and the cutting reel rotating mechanism is made or broken by an idler pulley applied against the inside of the driving belt for tightening or loosening the belt which interconnects these elements, thereby eliminating alternate flexing of the belt and accordingly decreasing its wear and increasing its life.

Another object is to provide a power lawnmower driving mechanism as set forth above wherein an idler pulley is mounted on an arm which is pivotally mounted upon a portion of the engine crankcase or frame spaced apart from the engine drive shaft and moved to and fro by a rod connected to a hand lever on the lawnmower guiding handle so as to tighten or loosen the belt by engaging or disengaging the idler pulley therewith.

Another object is to provide a power lawnmower driving mechanism as set forth in the preceding objects wherein the hand lever and rod are so mounted and adjusted that the rod passes slightly over the dead center formed by the hand lever pivot when the idler pulley has been moved its maximum distance into engagement with the belt to tighten it, an adjustment being preferably provided on the rod to shorten or lengthen the distance between the idler pulley axis and the pivot axis of the rod on the hand lever so as to adjust the tightness of engagement of the idler pulley with the belt.

In the drawings:

Figure 1 is a side elevation of a power lawnmower with a driving mechanism, according to a preferred form of the invention, partly broken away to show the driving belt in its tightened or driving position;

Figure 2 is a fragmentary top plan view of the end of the power lawnmower having the driving mechanism shown in Figure 1;

Figure 3 is an approximately vertical section along the line 3—3 in Figure 1, showing details of the belt tightening idler pulley and arm; and Figure 4 is a vertical section along the line 4—4 in Figure 1.

Referring to the drawings in detail, Figure 1 shows a small power lawnmower generally designated 10 equipped with a preferred form of the driving mechanism of the present invention, generally designated 11. Only that portion of the power lawnmower 10 is shown which contains the driving mechanism 11 and its adjoining parts, the remainder being conventional and beyond the scope of the present invention.

The power lawnmower 10 is provided with the usual frame generally designated 12 formed by end plates 13 (one only being shown) interconnected by tie rods 14 and a cutter bar 15, the latter being mounted on arms 16 extending downward and rearward from the end plates 13. The end plates 13 are also interconnected by a rod or stationary shaft 17, the reduced diameter ends 18 of which pass through the end bosses 19 of arms 20 extending upwardly and rearwardly from the end plates 12 and are threaded to receive lock nuts 21 (Figure 2).

The end plates 13 are provided with axles 22 secured thereto as by the bolts 23. Rotatably mounted on the axles 22 are wheels 24 carrying tires 25. Journaled in the end plates 13 are the opposite ends of a cutting reel shaft 26 carrying the usual cutting reel 27 equipped with spiral cutting blades 28 mounted on conventional spiders (not shown) and aligned with the cutting edge of the stationary cutter bar 15 to cut the grass as the mower 10 advances.

Bolted as at 29 to the frame 12 is the base 30 of an internal combustion engine generally designated 31 having the usual cylinders or cylinder block 32 and crankcase 33 in which is journaled the engine crankshaft or output shaft 34, the latter being supported at one end by a boss 35 (Figure 2). An apron 36 extends over the top of the frame 12 and conceals the parts beneath as well as protecting them from dust or dirt.

Mounted on the engine output shaft 34 and secured thereto as by the pin 36a is a driving pulley 37 over which passes a belt 38. The latter also encircles and drives a driven pulley 39 which has a hub 40 loosely and rotatably mounted upon the shaft 17 (Figure 2). The hub 40 also carries a sprocket 41 which is partially encircled by a sprocket chain 43, the latter also partially encircling a sprocket 44 mounted upon the cutting reel shaft 26. In this manner, the cutting reel 27 is driven from the engine output shaft 34 by means of the belt 38. In order to prevent the belt 38 from looping outward along its forward course and thereby binding in either of the pulleys 37 or 39, the apron 36 adjacent the belt 38 is provided with an upwardly extending U-bolt 45 secured thereto as by the nuts 46 and 47 threaded upon the free ends thereof on opposite sides of the apron 36 (Figure 4), the midportion 48 thereof encountering the forward course of the belt 38 when it loops forward.

The driving mechanism 11, in addition to the pulleys 37 and 39 and belt 38, also includes an idler pulley 50 (Figures 1 and 3) which engages the inside of the belt 38. The idler pulley 50 is journaled upon a bushing 51 secured by the bolt or stud 52 to the boss 53 upon the lower end of a swinging arm 54, the boss 53 having a threaded bore 55 for receiving the threaded end of the bolt or stud 52. The arm 54 at its upper end carries a boss 55 which is pivotally mounted upon the portion 56 of the stud bolt or pivot bolt 57 (Figure 3), the latter being threaded into the bore 58 in the boss 59 which projects horizontally from the engine crankcase 33.

Threaded into the hole 60 in the intermediate portion of the arm 54 is a stud bolt or pivot bolt 61, the portion 62 of which pivotally supports the collar 63. Secured to the collar 63 is one end of an adjustable rod unit 64 consisting of rod sections 65 and 66 having oppositely threaded ends 67 and 68 respectively threaded into the correspondingly oppositely threaded bores 69 and 70 of an adjusting sleeve 71 (Figure 1). The upper end of the rod section 66 is connected to a collar 72 which pivotally engages a pivot pin 73 mounted on the end of one arm 74 of a bell crank lever 75, the other arm 76 of which serves as a handle.

The hub of the bell crank lever 75 is journaled upon a pivot pin or stud bolt 77 which in turn is seated in a tubular bracket 78 mounted upon the upper portion of a handle 79 which is provided with a cross bar 80 for the hands of the operator. A pin 81 mounted upon the bracket 78 engages a projection 82 on the bell crank lever 75 and limits its swinging motion in that direction. It will be observed from Figure 1 that when the lever 75 is in the position shown therein, the axis of the rod section 66 passes slightly beyond or over the axis of the pivot stud or bolt 77 before the projection 82 hits the pin 81, the rod section 66 thus passing over dead center and thereby holding the arm 54 and idler pulley 50 in their belt-tightening positions (Figure 1). The handle 79 extends downward in yoke portions 83, the lower ends 84 thereof being flattened (Figure 2) and bored for the passage of the threaded ends of the shaft 17.

In the operation of the invention, to cause the engine shaft pulley 37 to drive the sprocket pulley 39 and therefore rotate the cutting reel 27 so as to cut the grass, the operator grasps the handle portion 76 of the bell crank lever 75 and swings it into the position shown in Figure 1. Assuming that the sleeve 71 has been rotated a sufficient amount in one direction or the other to shorten or lengthen the rod unit 64 so that the arm 54 is in the most suitable position where the idler pulley 50 engages the inside of the rearward course of the belt 38 to sufficiently tighten the latter, the belt 38 transmits power from the driving pulley 37 to the driven pulley 39. The latter in turn rotates the sprocket 41 and this rotates the sprocket 44 by means of the sprocket chain 43, causing the cutting reel shaft 26 and cutting reel 27 to rotate and cut the grass. At the same time, the lower arm 74 of the bell crank lever 75 swings the axis of the rod section 66 across its dead center consisting of the axis of the pivot or stud bolt 77, the projection 82 coming to rest against the pin 81. The operator then grasps the cross bar 80 and pushes the lawnmower forward, causing it to cut the grass and at the same time guiding it in the desired path.

When the operator desires to halt the rotation of the cutting reel 27, he grasps the handle 76 of the bell crank lever 75 and swings it forward, causing the rod section 66 to swing over dead center. The rod unit 64 then pushes upon the pivot bolt 61 mounted on the swinging arm 54 and swings the latter forward about the pivot bolt 57, carrying with it the idler pulley 50. This causes the belt 38 to slacken, loosening its grip upon the pulleys 37 and 39. The U-bolt 45 acts to engage the forward course of the belt 38 and prevent it from looping outward, thereby also preventing it from resuming its grip upon the pulley 37 and accidentally continue the driving connection.

Since the swinging arm 54 for the idler pulley 50 is journaled upon a stationary element, namely the stud bolt 57, it is subject to negligible wear. In contrast to this, if the arm 54 is mounted upon the engine shaft 34, excessive wear occurs at the pivotal supporting point of the arm, even when anti-friction bearings are used. Since the stud bolt 57 does not rotate, as does the engine shaft 34, anti-friction bearings for this purpose are not needed in order to pivotally support the arm 54 and a simple yet effective driving mechanism is provided. In practice, it is also found that the belt 38 operates satisfactorily as a clutch in this manner, even though the idler pulley 50 tightens it on the tight or rearward side of the belt 38.

Prior belt-tightening mechanisms tighten or loosen the belt by urging an idler pulley inwardly against the outside of the belt. In such prior arrangements, the idler pulley requires the belt to flex inwardly whereas its driving and driven pulleys require it to flex outwardly. This alternate inward and outward flexing in opposite directions of prior mechanisms subjects the belt to great strain and materially shortens its life. In the belt-tightening mechanism of the present invention, however, the idler pulley is applied against the inside of the belt and urges it outwardly. When the belt passes over the idler pulley in the present mechanism, therefore, it not only flexes in the same direction as it does on the driving and driven pulleys but actually reduces the flexing at these pulleys. Consequently, the belt-tightening mechanism of the present invention, by eliminating alternate flexing of the belt in opposite directions and by reducing the amount of flexing in the same direction, namely outward flexing at the driving and driven pulleys, greatly decreases the strain on the belt and materially adds to the life of the belt.

What we claim is:

A driving and clutching device for drivingly connecting the cutting mechanism of a power lawnmower to the output shaft of a driving engine, comprising a driving wheel connected to said output shaft, a driven wheel connected to said cutting mechanism, an endless flexible connector loosely interconnecting and partially encircling said wheels, a pivot member mounted on a portion of said lawnmower outside said flexible connector and spaced apart from said output shaft, a lever pivotally mounted on said pivot member, a pressure wheel rotatably mounted on said lever remote from said pivot member and disposed inside said flexible connector and swingable as a unit with said lever into tightening engagement with the inside surface of said flexible connector, and an operating device operatively connected to said lever for swinging said lever to and fro relatively to the inside surface of said flexible connector.

EDWIN S. GEORGE.
HAROLD L. BLYDENBURGH.

REFERENCES CITED

The following references are of record in the file of this patent:

UNITED STATES PATENTS

| Number | Name | Date |
|---|---|---|
| 1,819,133 | Stegeman et al. | Aug. 18, 1931 |
| 2,133,512 | Herge | Oct. 18, 1938 |
| 2,160,259 | Cooper | May 30, 1939 |
| 2,292,580 | Moyer | Aug. 11, 1942 |